United States Patent [19]
Gordon

[11] Patent Number: 4,581,529
[45] Date of Patent: Apr. 8, 1986

[54] READ/WRITE SYSTEM FOR OPTICAL DISC APPARATUS WITH FIBER OPTICS

[75] Inventor: Eugene I. Gordon, Convent Station, N.J.

[73] Assignee: AT&T Bell Laboratories, Murray Hill, N.J.

[21] Appl. No.: 523,015

[22] Filed: Aug. 15, 1983

[51] Int. Cl.[4] .............................................. H01J 5/16
[52] U.S. Cl. ...................................... 250/227; 369/44
[58] Field of Search ...................... 369/44, 45, 46, 112; 250/201, 204, 570, 227, 225; 350/96.1

[56] References Cited

U.S. PATENT DOCUMENTS

| | | | |
|---|---|---|---|
| 3,512,861 | 5/1970 | Schackert | 350/96 |
| 3,980,811 | 9/1976 | Schaefer et al. | 350/96.1 |
| 4,030,122 | 6/1977 | Chemelli et al. | 358/127 |
| 4,107,242 | 8/1978 | Runge | 264/1 |
| 4,135,083 | 1/1979 | Van Alem et al. | 250/201 |
| 4,292,260 | 9/1981 | Cheung | 264/1.5 |
| 4,337,531 | 6/1982 | Willemsen | 369/45 |

OTHER PUBLICATIONS

"Lightguide Theory and Its Implications in Manufacturing", *The Western Electric Engineer*, Jefferies et al., vol. 24, (Winter, 1980) pp. 13–23.

"Liquid Crystal Switching Components", *Digest of Papers*, Fiber Optical Conference, Soref (1980), pp. 21–25.

"High Performance Optical Reader for VideoDisc Substrates", *RCA Review*, Lurie et al., vol. 43 (Mar. 1982), pp. 128–166.

"Single Polarization Fiber", *Abstracts of the 6th Topical Meeting on Optical Fiber Communications*, Simpson et al., (Mar. 1983), pp. 32–33.

*Primary Examiner*—David C. Nelms
*Attorney, Agent, or Firm*—Lester H. Birnbaum

[57] ABSTRACT

A read/write system is disclosed for optical disc apparatus. The light source is removed from the head and optically coupled to the disc by a single-mode fiber which acts as a spatial filter. Adverse effects on the light source due to reflection from the disc are avoided by making the fiber length greater than one-half the coherence length of the source. A sparing switch and combiner component may be included in the system. An array of discrete light sources, each coupled to an associated fiber, may also be employed for multiple track accessing.

15 Claims, 6 Drawing Figures

READ/WRITE SYSTEM FOR OPTICAL DISC APPARATUS WITH FIBER OPTICS

BACKGROUND OF THE INVENTION

This invention relates to optical disc apparatus, and in particular, to a means for accessing information into and out of optical disc media.

Optical disc technology is currently gaining increasing importance in the field of information storage and retrieval primarily due to greater storage capacity of the discs and the potential for less costly apparatus than standard magnetic disc technology.

Typically, the optical disc includes one or more layers of suitable materials (such as bismuth or selenium) in which pits are formed along a large number of tracks concentric with the center of the disc. The presence or absence of a pit, as well as the length of a pit, can represent information in either digital or analog form. This pit structure can be formed by the light from a powerful "write" laser. Since the pits locally modify the reflectivity of the disc medium, the information can be retrieved by the light from a "read" laser. In addition, a "tracking" laser may be used to determine the position of the read/write head radially and azimuthally with respect to the disc. The lasers are usually included in the read/write/tracking head or closely spaced from the head. A beam splitter or mirror directs the light from a laser/lens combination to a lens which focuses the beam onto a spot on a track of the disc. Where the beam is used for read-out, the reflected light is directed to one or more photo-detectors so that as the disc rotates, the information along the track is reproduced in electrical form. Motion of the head along a radius allows access to any one of the tracks.

One problem associated with such apparatus is that the laser is subjected to vibration and shock during operation. The amplitude of the laser output can also be affected by reflected light from the disc, making the laser output power noisy. Although some proposals have been made for removing the laser from the area of the head in certain apparatus (see, e.g., Lurie et al, "High Performance Optical Reader for Video Disc Substrates," *RCA Review*, Vol. 43, pp. 128–166 (March 1982)), several other serious problems remain. The most serious problem is the fact that each laser typically emits light in the form of a beam with an irregular amplitude distribution across the beam waist. This distribution is characterized by free space, spatial modes above the fundamental mode. When an attempt is made to focus such a waist, the image is typically a pattern which is not ideally suited for writing or reading unless a very tedious and expensive alignment process is performed between the optics in the head and the laser or very complex optical configurations are employed. Since each laser emits a different beam, this alignment has to be repeated for each apparatus and each time a new laser is installed in existing apparatus. A further problem with existing apparatus is the costly down-time which results if a laser should fail. Also, for certain systems, it may be desirable to provide additional power in the laser beams than is available from a single laser.

It is also recognized that the data rate for a given rate of disc rotation can be increased if several tracks are accessed simultaneously. Alternatively, a given data rate can be maintained while the disc rotation is decreased if it is desirable to minimize power needed to rotate the disc or simplify the design for the disc drive mechanism. Multiple track reading is usually thought to require integrated arrays of lasers and/or lenses (see, for example, U.S. patent application of Damen-Duguay-Howard-Jackel-Skocpol, Ser. No. 487,248, filed on Apr. 21, 1983 and assigned to the present assignee). While this is a viable approach to the problem, the difficulties associated with fabrication of arrays of identical lasers or lenses may or may not provide optimum cost effectiveness in the near future.

It is therefore an object of the invention to provide a read/write/tracking system which overcomes the problems enumerated above.

SUMMARY OF THE INVENTION

This and other objects are realized in accordance with the invention which is an optical disc apparatus including means for accessing information in a recording medium. The accessing means comprises a laser positioned at an area of choice remote from the recording medium and a single-mode optical fiber adapted to transmit light from the laser to a predefined area above the surface of the recording medium and to produce at its output the same size and shape spot having the lowest order Gaussian mode distribution regardless of the laser source.

BRIEF DESCRIPTION OF THE DRAWING

These and other features of the invention are delineated in detail in the following description. In the drawings.

It will be appreciated that for purposes of illustration, these figures are not necessarily drawn to scale.

DETAILED DESCRIPTION

The basic principles of the invention will now be described with reference to the embodiment schematically illustrated in FIG. 1. It will be appreciated that elements not necessary for understanding such principles have been omitted for the sake of clarity.

An optical storage disc, 11, is shown mounted on a turntable, 10. The disc typically includes layers such as bismuth where information can be stored in the form of pits which alter the reflectivity of the material. The storage material may also comprise a magneto-optic material where local magnetization can be altered by a write laser to locally change the optical properties of the medium. The present invention may be utilized to write the information in the medium or to read out information stored in the medium for purposes of information retrieval or tracking. In this example, it is assumed that it is desired to write the information. If read-out is desired, the apparatus can include standard optical components and photo-detectors for receiving light reflected from the disc, which light has been directed to the disc in the manner to be described.

The source of light can be a standard, current injection semiconductor laser, such as one made of GaAlAs which emits light at a wavelength of about 0.8 microns. In this example, the laser is illustrated as element, 25, and is shown mounted on a standard mount, 23, and protected by a standard enclosure, 24. The laser is removed from the area of the disc, 11, and turntable, 10, to avoid damage due to vibration and shock, to simplify electrical connection to the laser, and to better control the ambient temperature of the laser. Further, the light path is made greater than one-half the coherence length of the light, which may be several meters, in order to mitigate the effects of reflection of the light from the disc back into the laser. Typically, the lasers would be positioned somewhere below the mechanical driving mechanism for the turntable (not shown) and the light path would be in the range 1–10 meters long.

In accordance with a feature of the invention, the light from the laser is transmitted to the area above the disc by a single-mode optical fiber, 15. In this example, light from laser, 25, is first coupled to single-mode fiber, 21, which is in turn coupled to fiber, 15, by means of single-mode fiber connector, 16. The light from fiber, 15, is coupled to the read/write head, 17, which also includes a lens, 18, for focusing the light onto the disc as shown. Alternatively, fiber, 21, can be plugged directly to the head through connector, 16. The head is moved in the radial direction as shown for writing on any portion of the disc while it is rotating.

Figure 6:
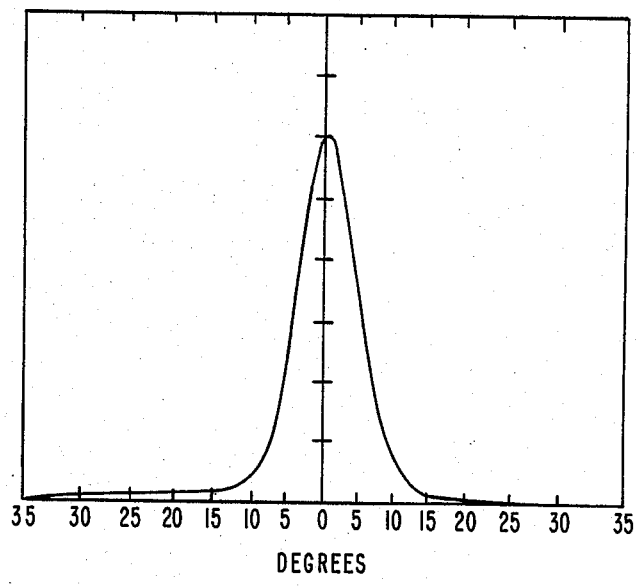
FIG. 6 is an illustration of the desired amplitude distribution of light delivered to the area of the recording medium in accordance with the invention.

Single-mode fibers are generally known in the art for transmitting light over long distances in lightwave communications (see, e.g., Jefferies et al, "Lightguide Theory and its Implications in Manufacturing," *Western Electric Engineer*, Vol. 24, pp. 13–23 (Winter, 1980) which is incorporated by reference herein). Such fibers are generally characterized by very small core diameters (typically less than 10 $\mu$m) and a small index of refraction difference from core center to cladding (typically less than 0.8%). Such fibers are advantageous in lightwave communications because there is no modal dispersion and a greater bandwidth is possible relative to multi-mode fibers due to a reduced broadening of the pulse for a given transmission distance. Here, the fiber serves a different function in that it acts like a spatial filter by removing unwanted free space spatial modes emitted by the laser. That is, lasers tend to emit light which has an irregular distribution along its waist characterized mathematically by a Gaussian envelope superimposed on a Hermite polynomial of order greater than or equal to one. The fiber, on the other hand, will transmit only the fundamental (lowest order) spatial mode, which is an essentially perfect Gaussian distribution along the waist of the beam. An example of the amplitude distribution of the fiber is illustrated in FIG. 6. The size of the spot from the fiber would typically be approximately 5 $\mu$m. Thus, the single-mode fiber, 15, produces a circular, spatially coherent, spot ideally suited as a source spot for the read/write head. Since the radiation pattern and near field pattern at the output end of such a cleaved fiber is highly reproducible, the lens-fiber combination in the head can be optimized. It is particularly important to note that the resulting focused spot is independent of the laser source since only the fundamental mode of the fiber will be transmitted. This is to be contrasted with the radiation pattern and near field pattern of a laser by itself which is highly variable from one laser to another and over a period of time. Thus, in prior apparatus, each laser/lens combination had to be optimized. Further, since the spot from the fiber is typically larger than that from the laser (5 $\mu$m as opposed to 1–2 $\mu$m), alignment is easier.

It is also preferable, though not required, that the fiber be capable of maintaining the polarization of the light beam from the source. This permits use of polarization-sensitive optics such as a polarization beam splitter and quarter-wave plate (not shown) in the optical path as part of the read-out optics (see, e.g., Lurie et al cited above at p. 158). It also permits use of polarization-dependent components as sparing switches or combiners as discussed below. Polarization-maintaining fibers are available in the art and are described, for example, in *Abstracts of the 6th Topical Meeting on Optical Fiber Communications*, pp. 32–33 (March 1983).

Figure 1:
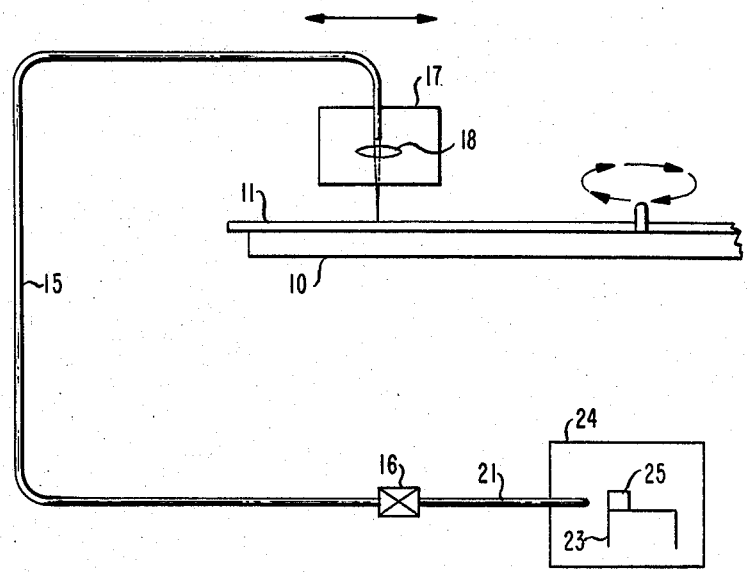
FIG. 1 is a front schematic view of a read/write system in accordance with one embodiment of the invention.
Figure 2:
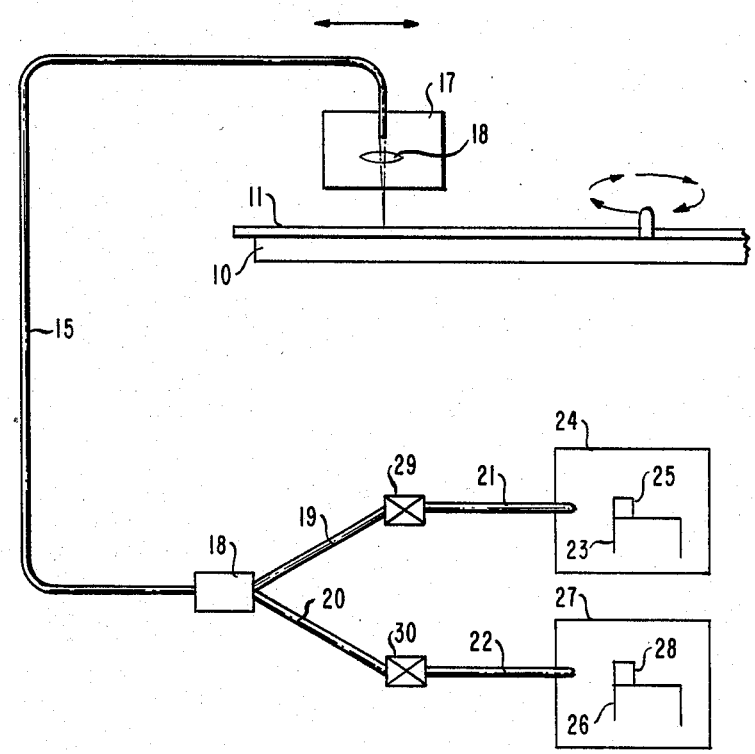
FIG. 2 is a front schematic view of a read/write system in accordance with a further embodiment.

FIG. 2 illustrates a further embodiment of the invention with elements similar to those in FIG. 1 being similarly numbered. This embodiment is characterized by the presence of a second laser, 28, mounted on a standard mount, 26, and enclosed in casing, 27. Here, the light from laser, 25, is coupled to fiber, 15, through fiber, 21, single-mode connector, 29, single-mode fiber, 19, and element, 18, which can be either a sparing switch or a combiner as discussed in more detail below. Similarly, the light from laser, 28, is coupled to the head fiber through single-mode fiber, 22, single-mode connector, 30, single-mode fiber, 20, and element, 18.

As mentioned above, component, 18, can be a sparing switch which would, for example, couple light only from laser, 25, to fiber, 15, and, if that laser should fail, then couple the light from laser, 28. This switch may take any of the forms known in the art of lightwave communication, such as those employing mechanical motion of a silicon chip which includes grooves containing the fiber (see, e.g., U.S. patent application of W. C. Young, Ser. No. 432,254, filed Oct. 1, 1982 and assigned to the present assignee). The switch might also employ a liquid crystal medium which transmits or reflects light depending upon the potential applied across the medium (see, e.g., Soref, "Liquid Crystal Switching Components," *Digest of Papers*, Fiber Optical Conference, pp. 21–25 (1980)).

Figure 3:
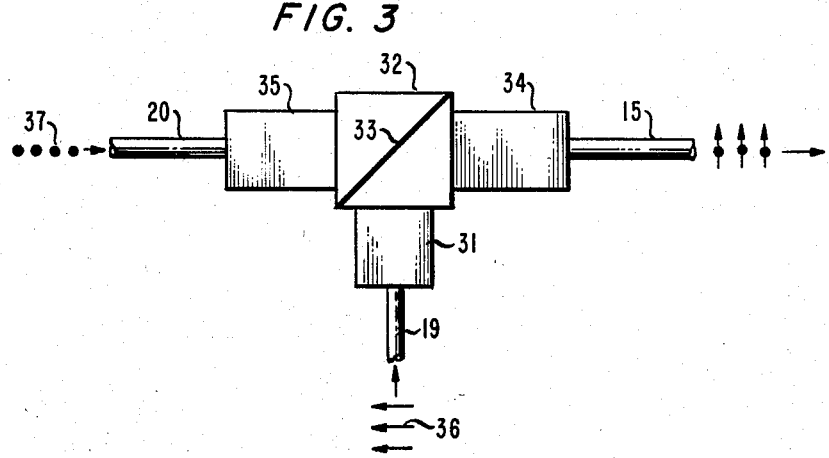
FIG. 3 is a cross-sectional view of a component in the apparatus of FIG. 2.

If the system is such that the power from a single laser is not sufficient, element, 18, can be an optical combiner which couples both light sources, 25 and 28, to fiber, 15. This can be accomplished, for example, with the device illustrated in FIG. 3 when polarization-maintaining fibers are used. As shown in the Figure, fiber, 19, propagates light (from source, 25) which is polarized in the plane of the drawing as indicated by the arrows, 36. Fiber, 20, propagates light (from source, 28) which is polarized in a direction normal to the plane of the drawing as indicated by the dots, 37. Both fibers are optically coupled to respective standard graded-index-of-refraction lenses, 31 and 35, which expand the beams and couple them onto respective surfaces of a beam-splitting coating, 33, such as standard dielectric or metal layers which will transmit light polarized orthogonal to the plane and reflect light polarized parallel to the plane of the Figure. Thus, both beams from fiber, 20, and fiber, 19, will be incident on graded-index-of-refraction lens, 34, which focuses the combined beam onto fiber, 15 for transmission to the head. The combined beam is illustrated by the superposition of dots and arrows in fiber, 15, indicating that the combined light is not polarized.

The component illustrated in FIG. 2 may also be used as a sparing switch by simply using only one of the lasers at a time. Should that laser fail, the second laser can be turned on. This changes the polarization of the light in the output fiber. Thus, if the apparatus is designed for different functions based on polarization, this is a convenient way to achieve the polarization switch electrically.

It will be appreciated that combinations of sparing switches and combiners may be utilized in a single apparatus if desired.

The single-mode fiber connectors, 16, 29, and 30, may be the standard types such as those employing conical connectors at the ends of each fiber to be coupled which are inserted in a biconic sleeve (see, e.g., U.S. Pat. No. 4,107,242 issued to Runge and U.S. Pat. No. 4,292,260 issued to Cheung, both assigned to the present assignee).

Figure 4:
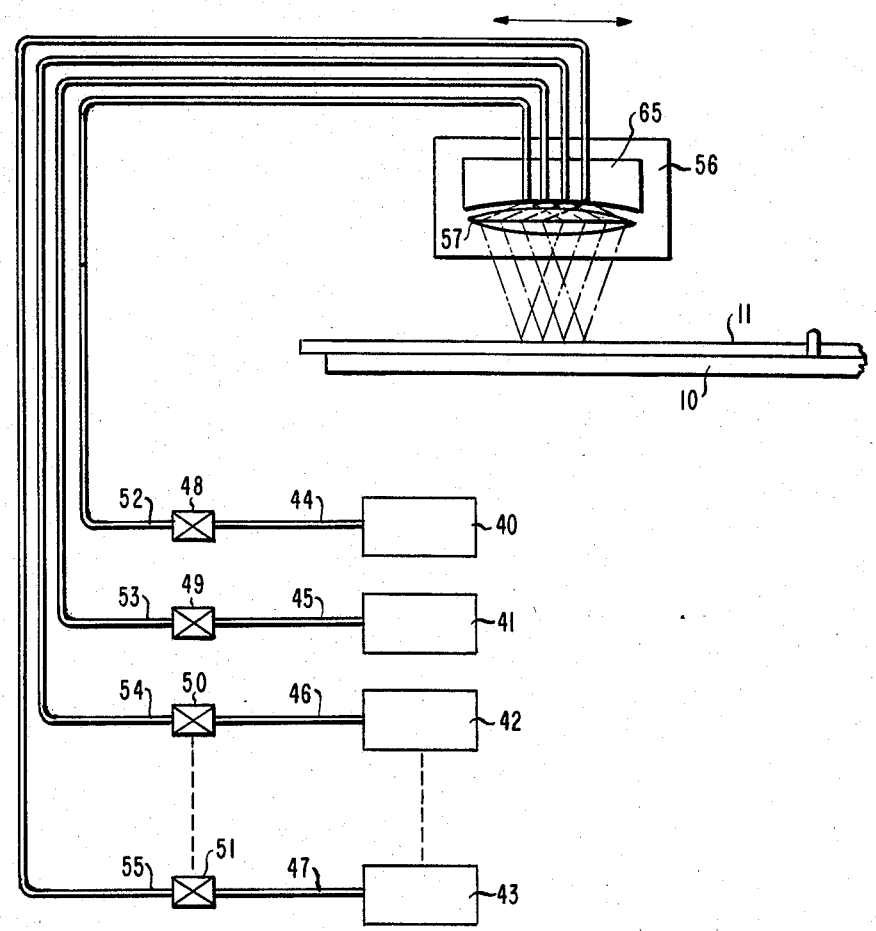
FIG. 4 is a front schematic view of a read/write system in accordance with a further embodiment of the invention.
Figure 5:
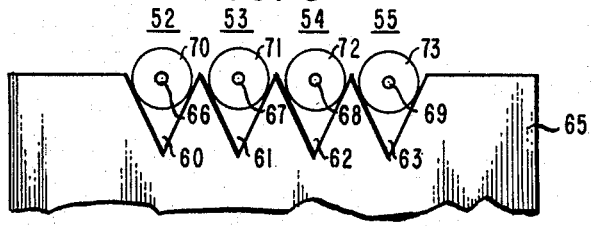
FIG. 5 is a cross-sectional view of a portion of the apparatus illustrated in FIG. 4.

Use of single-mode fibers for delivering the light to the head also permits a convenient means for accessing many tracks of the disc simultaneously. One embodiment of such an apparatus is illustrated schematically in FIG. 4. The embodiment shown includes four separate laser sources, illustrated as boxes, 40–43, but any number of sources might be employed. Each laser is coupled to its respective single-mode fiber, 44–47, to a connector, 48–51, and to a respective single-mode fiber, 52–55. The latter fibers are formed into a linear (or area) array which is secured to the read/write head, 56. The light emerging from the fiber array is focused by lens, 57, so that several tracks in disc, 11, are covered (e.g., one track for each fiber). The ends of the fibers may be aligned in the head by means of a block, 65, a portion of which is shown in an end view in FIG. 5. The block, which typically comprises silicon, includes a linear array of V-grooves, 60–63, formed in one surface. Placement of fibers, 52–55, therein exactly aligns the cores, 66–69, of each fiber as a result of the contact of the fiber claddings, 70–73, with the walls of the grooves. The block also typically includes a cover formed over portion, 65, and identical thereto to secure the fibers in the grooves. (The cover has been omitted for the sake of clarity in the illustration.) Use of such blocks should permit uniform spacing of fiber cores separated by 20 $\mu$m or even less. It should be noted that the output end of the block can be polished to give a spherical surface (see FIG. 4) in order to make it easier to focus the output of the fibers onto the flat disc surface.

It should be understood in the attached claims that the term "accessing" information is intended to include writing information in the medium or reading out information stored in the medium, whether for purposes of information retrieval or for purposes of tracking.

Various additional modifications of the invention will become apparent to those skilled in the art. All such variations which basically rely on the teachings through which the invention has advanced the art are properly considered within the spirit and scope of the invention.

What is claimed is:

1. Optical disc apparatus including means for accessing information in a recording medium comprising:
   a laser source positioned at an area remote from the recording medium; and
   a single-mode optical fiber adapted to transmit light from the laser at an input end to an area above the surface of the recording medium and to produce at its output end a spot having the lowest order Gaussian mode distribution.

2. Apparatus according to claim 1 wherein the light from the laser source is polarized and the fiber is also adapted to maintain the polarization of the light emitted by the laser source.

3. Apparatus according to claim 1 further comprising additional optical fibers which are optically coupled to the input end of the first fiber by connector means, one of said additional fibers having an input end for receiving the light output from said source.

4. Apparatus according to claim 1 further comprising a second laser source, where the light from the first and second sources is polarized in orthogonal directions and coupled to the fiber through an optical component which adds the outputs of the two sources.

5. Apparatus according to claim 1 further comprising a second laser source, where the first and second laser sources are coupled to the fiber through an optical component which permits the output of either of the sources to be coupled to the fiber alternatively.

6. Apparatus according to claim 4 or 5 where the laser sources are coupled to the component through single-mode fibers.

7. Apparatus according to claim 1 comprising a plurality of laser sources, the light from each being coupled to an input end of its own single-mode fiber, each fiber having an output end in the area above the recording medium.

8. The apparatus according to claim 7 wherein the output ends of the fibers are aligned in an array in the area above the recording medium by means of a block including an array of grooves where each fiber is positioned in one of the grooves.

9. The apparatus according to claim 8 wherein the output ends of the fibers are positioned to lie on a spherical surface above the surface of the recording medium.

10. The apparatus according to claim 7 wherein the recording medium includes a plurality of tracks and the light from each fiber is focused onto a different track in the recording medium.

11. Apparatus according to claim 1 wherein the laser has a certain coherence length and there is an optical path of the light from the laser to the recording medium, the optical path of the light from the laser to the recording medium being greater than one-half the coherence length of the laser.

12. Optical disc apparatus including means for accessing information in a recording medium comprising:
   at least two laser sources positioned at an area remote from the medium, the light from said sources being polarized;
   a plurality of single-mode fibers which maintains the polarization of light transmitted therethrough, with at least a first and second fiber receiving the light output from a respective laser source and at least a third fiber transmitting the light to an area above the recording medium so that a light spot at its output has the lowest order Gaussian mode distribution; and
   an optical component adapted to receive light from both the first and second fibers coupled to the sources and to transmit light from at least one source to the third fiber.

13. The apparatus according to claim 12 wherein the optical component transmits light from both sources simultaneously to the third fiber.

14. The apparatus according to claim 12 wherein the optical component transmits light alternatively from either of the sources.

15. Optical disc apparatus including means for accessing information simultaneously in several tracks in a recording medium comprising:
- a plurality of light sources positioned at an area remote from the medium, the light from said sources being polarized; and
- a plurality of single-mode fibers which maintains the polarization of light transmitted therethrough, each fiber adapted to receive light at an input end from one of the sources and transmit the light to an area above the recording medium at an output end, the output end of each fiber being positioned in a groove formed within a block so that the fibers are positioned in an array over the area of the recording medium and light from each fiber will be incident on a different one of the several tracks.

* * * * *